3,008,919
ACROLEIN-PENTAERYTHRITOL RESIN
COMPOSITIONS
Howard R. Guest, Charleston, and Ben W. Kiff, Ona, W. Va., assignors to Union Carbide Corporation, a corporation of New York
No Drawing. Filed Nov. 24, 1958, Ser. No. 775,684
7 Claims. (Cl. 260—45.5)

This invention relates to curable compositions and cured compositions derived from acrolein and pentaerythritol. In a particular aspect, this invention relates to curable compositions containing a liquid acrolein-pentaerythritol A-stage resin and a reactive diluent, and to cured resinous compositions produced therefrom.

The term "A-stage resin" refers to a liquid precondensate of acrolein and pentaerythritol having a viscosity between 5,000 and 500,000 centipoises (cps.) which is more fully described hereinafter.

The term "reactive diluent" as used herein refers to an organic liquid having a viscosity between 1 and about 100 centipoises which is a solvent for the A-stage resin and which becomes a substantive part of the compositions when they are cured to solid resins without deleteriously affecting the desirable properties of the cured resins, e.g., properties such as strength, toughness, transparency and inertness to light and moisture.

The valuable resinous compositions derived from the condensation of acrolein and pentaerythritol are most conveniently applied in coating, casting, molding, bonding and the like operations in the form of a liquid precondensate A-stage resin, and the shaped material is converted into a final solid form by curing with heat in the presence of an acid catalyst. The various properties of the cured solid resin vary according to the relative molar quantities of acrolein and pentaerythritol reacted and the conditions employed in producing the liquid A-stage resin. As a consequence of the variation of reaction conditions and quantities of reactants, the liquid A-stage resin has a viscosity which varies over an extremely broad range between about 5,000 centipoises and 500,000 centipoises. The A-stage resins of different viscosities are curable to solid resins which have different properties. Hence, the high viscosity A-stage resins are cured to resins with one particular combination of properties, and the low viscosity A-stage resins are cured to resins with another combination of properties.

Difficulty is encountered when the physical properties being sought in a final cured resins are derived from an A-stage resin which has a viscosity which is too high for practical use in the particular application. For example, in molding and casting operations, low viscosity resin formulations are preferred because they quickly and completely fill intricacies of molds; and in coating and bonding applications, low viscosity resin formulations are desirable because they are capable of accepting large amounts of solid materials, e.g., fillers and pigments.

The viscosity of the A-stage resin is also significant for other reasons. A given high viscosity A-stage resin may be suitable for more than one application, and in one use a high viscosity formulation is required and in another use a low viscosity formulation is necessary.

Reduction of the viscosity of A-stage resins has been attempted with various organic solvents miscible with A-stage resins, which include aromatic hydrocarbons such as toluene and benzene, esters such as ethyl acetate and butyl acetate, and ethers such as diethyl ether, diisopropyl ether and tetrahydrofuran. When organic solvents are employed in such a manner to lower the viscosity of A-stage resins, additional procedures and costly equipment must be employed to remove the solvent in converting the liquid A-stage resin to the solid cured form. Oftentimes some solvent is entrained in the resin which causes the formation of bubbles thereby weakening the cured resin and deleteriously affecting other desired properties and, additionally, providing sites for attack by chemicals. Further, in the preparation of large castings where the viscosity of the A-stage resin has been reduced with a solvent to allow the formulation to flow into small interstices, the removal of the solvent causes undesirable voids to be formed. Often such large castings are in a form or a position where it is impossible to remove the solvent or recover it.

Accordingly, it is an object of this invention to provide a method for reducing the viscosity of A-stage resins.

It is another object of this invention to provide liquid A-stage resin formulations which have a viscosity suitable for a wide range of applications.

It is a further object of this invention to provide A-stage resin compositions containing a diluent which reacts to become a substantive part of the resin in the cured solid form.

It is still another object to provide cured acrolein-pentaerythritol resins having strength, toughness, transparency, inertness to light and moisture, and other desirable properties, which are prepared from diluted A-stage resin compositions that cure without volatilization of components.

Other objects and advantages will become apparent to those skilled in the art from the accompanying description and disclosure.

This invention provides compositions comprising a liquid A-stage resin and a reactive diluent selected from the class of 2-vinyl-1,3-dioxanes and 2-vinyl-1,3-dioxolanes.

The preferred curable compositions provided by this invention are those comprising a liquid condensation resin of acrolein and pentaerythritol having a viscosity of 5,000 to 500,000 centipoises at a temperature of 25° C., and a compound corresponding to the formula:

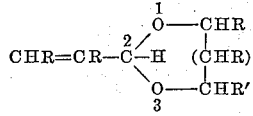

wherein R is selected from the group consisting of hydrogen and alkyl radicals containing between one and four carbon atoms; R' is selected from the group consisting of hydrogen, alkyl radicals containing between one and four carbon atoms, and alkylol radicals containing between one and four carbon atoms; and $m$ is an integer equal to zero or one. The compound is a dioxolane derivative when $m$ is zero, and it is a dioxane derivative when $m$ is one.

The term "alkylol" refers to a monovalent hydroxyalkyl radical. For example (—$CH_2OH$) is a "methylol" radical.

The reactive diluent, i.e., a 2-vinyl-1,3-dioxane or a 2-vinyl-1,3-dioxolane, in a quantity between about 5 and 15 weight percent, based on the weight of A-stage resin, is generally effective in producing the desired reduction in viscosity of the A-stage resin while at the same time allowing the retention of the desirable characteristics in the final cured polymer. More than 15 weight percent of reactive diluent can be employed in the compositions, but when these larger quantities above about 20 weight percent become incorporated as a substantive part of the resin in the curing stage, the normally excellent properties characteristic of the resin may be deleteriously affected. For example, the impact strength of the cured resin may be reduced or the heat distortion point may be lowered.

The reactive diluents preferred to be employed in the compositions are those which have a viscosity between about 1 and 100 centipoises (cps.). Representative of the preferred reactive diluents which correspond to the general formula described above are 4-methyl-2-vinyl-1,3-dioxolane, 2-(1-methylvinyl)-4-hydroxymethyl-1,3-dioxolane, 2-vinyl-1,3-dioxolane, 2-(1-methylvinyl)-5-ethyl-4-propyl-1,3-dioxane, 2-vinyl-5-ethyl-6-propyl-1,3-dioxane, 2-vinyl-4-hydroxymethyl-1,3-dioxolane, 2-(2-methylvinyl)-4-hydroxyethyl-5-butyl-1,3-dioxolane, and the like. The reactive diluents which correspond to the above-described general formula have a viscosity in the preferred range and they are miscible with A-stage resins in all proportions, and they do not have an undesirable effect on the properties of the compositions in the final cured stage.

2-vinyl substituted 1,3-dioxanes and 1,3-dioxolanes are readily prepared by the condensation of suitable α,β-unsaturated aldehydes with alkanediols and alkanetriols which have two alcohol groups alpha,beta or alpha,gamma to each other. For example, 2-vinyl-1,3-dioxolane is synthesized by the condensation of acrolein with ethylene glycol in the presence of an acid catalyst such as p-toluenesulfonic acid. Similarly, 2-(1-methylvinyl)-5-ethyl-4-propyl-1,3-dioxane is produced by the condensation of methacrolein with 2-ethylhexane-1,3-diol.

The liquid A-stage resin is conveniently prepared by reacting pentaerythritol with acrolein in stoichiometric quantities corresponding approximately to the reciprocal of their functionalities (e.g., 3 moles of pentaerythritol to 4 moles of acrolein). The ratio of reactants usually varies between about 1.3 moles and 1.9 moles of acrolein for each mole of pentaerythritol. The condensation polymerization reaction is conducted at a temperature between about 60° C. and 100° C. for a period of time between one-half hour and five hours in the presence of an acid catalyst such as hydrochloric acid, sulfuric acid, benzenesulfonic acid, toluenesulfonic acid and the like. The acid catalyst is employed in an amount between 0.05 and 2.0 weight percent, based on the total weight of reactants. At the conclusion of the polymerization period, unreacted materials and the water of reaction are removed by distillation. The liquid A-stage resin is a viscous material which slowly condenses to a solid plastic on standing. For practical purposes, the condensation is stopped by neutralization or removal of the catalyst. The neutral liquid A-stage resin can be stored until needed.

Hydrochloric acid has been found to be a particularly excellent catalyst for the preparation of the A-stage resin. It is not necessary to completely remove or neutralize hydrochloric acid in the A-stage resin because its presence does not cause the material to condense to a solid plastic on standing.

The curable compositions of this invention can be prepared by the simple mixing together of the A-stage resin and the reactive diluent at room temperature. The reactive diluent can be mixed with the A-stage resin and the curable composition stored for an indefinite period, or the reactive diluent can be added to the A-stage resin at the time that the curable composition is to be applied and cured.

If the A-stage resin is prepared using hydrochloric acid as a catalyst, or if one of the other suitable acids is used as a catalyst and it has been removed or neutralized with sodium acetate or some other alkaline material, then it is necessary to add an acid catalyst in order to convert the curable compositions to the final cured material. A quantity of catalyst is preferred which is between about 0.1 and 1.0 weight percent, based on the total weight of A-stage resin and reactive diluent. Suitable curing catalysts include sulfuric acid, toluenesulfonic acid, benzenesulfonic acid, phosphoric acid, stannic chloride, aluminum chloride, boron trifluoride, ferric chloride, titanium tetrachloride, mixed alkanesulfonic acids, and the like. The curing reaction can be accomplished at temperatures from about 50° C. to 200° C., with the preferred temperature range being between about 70° C. and 120° C. The curing time required can vary from a few minutes to seventy-two hours depending upon the curing temperature. Thus, at 50° C. as long as seventy-two hours may be required for a proper cure, while at 150° C. as little as ten minutes may be sufficient. At 70° C. the usual curing time is sixteen hours, while at 100° C. from three to eight hours is required.

The compositions of this invention may be used in any of the applications where rigid plastic materials of good strength, toughness and transparency are desired. Because of their inertness to light and moisture, the compositions are valuable in many fields now served by the methyl methacrylate resins, such as display signs, ornaments, fixtures and dentures. The compositions may also be used as sealing and potting compounds in the electrical industry.

The following examples will serve to illustrate specific embodiments of the invention. Viscosities were determined with a Brookfield viscometer model LVF. The other physical property data indicated in the examples were determined in accordance with ASTM testing methods.

| Physical property: | ASTM test procedure |
|---|---|
| Heat distortion (° C.) | D-648. |
| Izod impact | D-256. |
| Hardness, durometer "D" | D-676-49T (modified). |

Example 1

There was charged to a 5-liter reaction flask a mixture of 1865 grams of 98.5 percent pentaerythritol, 1287 grams of 97 percent acrolein and 12.7 grams of 37 percent hydrochloric acid. This mixture was heated with stirring at a temperature of 70° C. to 73° C. for one and one-half hours. The mixture was then transferred to a distilling flask and volatile components were distilled off until the flask temperature reached 70° C. at a pressure of 5 millimeters of mercury. A liquid A-stage resin was recovered which had a viscosity of 81,000 cps. at a temperature of 25° C.

To a portion of this material there was added 0.3 percent by weight of alkanesulfonic acid [1] and the mixture was heated for a period of sixteen hours at a temperature of 100° C. The cured polymer had the following properties:

| | |
|---|---|
| Heat distortion ° C.. | 95 |
| Impact strength (Izod) ft. lbs./in. of notch | 0.3 |
| Hardness, durometer "D" | 84 |

Example 2

To a portion of the A-stage liquid prepared in Example 1, there was added 10 percent by weight of 2-vinyl-1,3-dioxolane. The viscosity of the resin mixture was 10,000 cps. at a temperature of 25° C. There was then added 0.3 percent by weight of alkanesulfonic acid and the mixture was cured for sixteen hours at a temperature of 100° C. The resulting cured polymer had the following properties:

| | |
|---|---|
| Heat distortion ° C.. | 68 |
| Impact strength (Izod) ft. lbs./in. of notch | 0.4 |
| Hardness, durometer "D" | 83 |

Example 3

To a portion of the A-stage liquid prepared in Example 1 there was added 15 percent by weight of 2-vinyl-1,3-dioxolane. The viscosity of the resin mixture was 1,690 cps. at a temperature of 25° C. After the addition of 0.3 percent by weight of alkanesulfonic acid, the resin mixture was cured for sixteen hours at a temperature of

---

[1] A mixture containing predominantly ethanesulfonic acid and a small quantity of methanesulfonic acid and propanesulfonic acid.

100° C. and the resulting polymer had the following properties:

Heat distortion _____ ° C__ 58
Impact strength (Izod) ft. lbs./in. of notch_____ 0.3
Hardness, durometer "D"_____ 84

Example 4

To a portion of the A-stage liquid prepared in Example 1, there was added 20 percent by weight of 2-vinyl-1,3-dioxolane. The resin mixture had a viscosity of 600 cps. at a temperature of 25° C. After the addition of 0.3 percent by weight of alkanesulfonic acid, the mixture was cured for sixteen hours at a temperature of 100° C. and the resulting polymer had the following properties:

Heat distortion _____ ° C__ 48
Impact strength (Izod) ft. lbs./in. of notch_____ 0.3
Hardness, durometer "D"_____ 81

Example 5

To a portion of the A-stage liquid prepared in Example 1 there was added 15 percent by weight of 2-vinyl-4-hydroxymethyl-1,3-dioxolane. The resin mixture had a viscosity of 8,900 cps. at a temperature of 25° C. After the addition of 0.3 percent by weight of alkanesulfonic acid, the resin was cured for sixteen hours at a temperature of 100° C. and the polymer which resulted had the following properties:

Heat distortion _____ ° C__ 70
Impact strength (Izod) ft. lbs./in. of notch_____ 0.5
Hardness, durometer "D"_____ 84

Example 6

To a portion of the A-stage liquid prepared in Example 1 there was added 10 percent by weight of 2-(1-methylvinyl)-5-ethyl-4-propyl-1,3-dioxane. The viscosity of the resin mixture was 19,700 cps. at a temperature of 25° C. After the addition of 0.3 percent by weight of alkanesulfonic acid, the resin mixture was cured for sixteen hours at a temperature of 100° C. and the resulting polymer had the following properties:

Heat distortion _____ ° C__ 63
Impact strength (Izod) ft. lbs./in. of notch_____ 0.3
Hardness, durometer "D"_____ 84

Example 7

To a portion of the A-stage liquid prepared in Example 1 there was added 10 percent by weight of 2-(1-methylvinyl)-5-ethyl-4-propyl-1,3-doixane. The resin mixture had a viscosity of 17,200 cps. at a temperature of 25° C. After the addition of 0.3 percent by weight of alkanesulfonic acid, the resin mixture was cured as in the previous examples and the resulting polymer had the following properties:

Heat distortion _____ ° C__ 67
Impact strength (Izod) ft. lbs./in. of notch_____ 0.3
Hardness, durometer "D"_____ 84

Example 8

An A-stage liquid was prepared in the same manner as described in Example 1. After all volatile material was stripped from the mixture, it had a viscosity of 60,800 cps. at a temperature of 25° C. A sample of this resin mixture was cured using 0.3 percent by weight of alkanesulfonic acid as in the previous examples and the resulting polymer had the following properties:

Heat distortion _____ ° C__ 88
Impact strength (Izod) ft. lbs./in. of notch_____ 0.56
Hardness, durometer "D"_____ 84

To a portion of this A-stage material there was added 5 percent by weight of 4-methyl-2-vinyl-1,3-dioxolane. The viscosity of the resin mixture was 13,200 cps. at a temperature of 25° C. After the resin mixture was cured as in the previous examples using 0.3 percent by weight of alkanesulfonic acid, the resulting polymer had the following properties:

Heat distortion _____ ° C__ 73
Impact strength (Izod), ft. lbs./in. of notch_____ 0.61
Hardness, durometer "D"_____ 84

Example 9

To a portion of the A-stage liquid prepared in Example 8, there was added 10 percent by weight of 4-methyl-2-vinyl-1,3-dioxolane, and the viscosity was 5,100 cps. at a temperature of 25° C. This resin mixture was cured in the usual manner using 0.3 percent by weight of alkanesulfonic acid and the resulting polymer had the following properties:

Heat distortion _____ ° C__ 62
Impact strength (Izod), ft. lbs./in. of notch_____ 0.93
Hardness, durometer "D"_____ 78

Example 10

To a portion of the A-stage liquid prepared in Example 8, there was added 15 percent by weight of 4-methyl-2-vinyl-1,3-dioxolane and the viscosity was reduced to 2,000 cps. at a temperature of 25° C. After this resin mixture was cured in the usual manner using 0.3 percent by weight of alkanesulfonic acid, the resulting polymer had the following properties:

Heat distortion _____ ° C__ 52
Impact strength (Izod), ft. lbs./in. of notch_____ 0.69
Hardness, durometer "D"_____ 81

What is claimed is:

1. A curable composition comprising a liquid condensation resin of acrolein and pentaerythritol having a viscosity of 5,000 to 500,000 centipoises at a temperature of 25° C., and a compound corresponding to the formula:

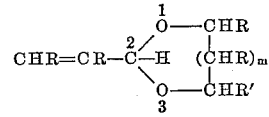

wherein R is selected from the group consisting of hydrogen and alkyl radicals containing between one and four carbon atoms inclusive; R' is selected from the group consisting of hydrogen, alkyl radicals containing between one and four carbon atoms inclusive, and alkylol radicals containing between one and four carbon atoms inclusive; and m is an integer selected from zero and one.

2. A curable composition comprising a liquid condensation resin of acrolein and pentaerythritol having a viscosity of 5,000 to 500,000 centipoises at a temperature of 25° C., and between 5 and 15 weight percent, based on the weight of said resin, of 2-vinyl-1,3-dioxolane.

3. A curable composition comprising a liquid condensation resin of acrolein and pentaerythritol having a viscosity of 5,000 to 500,000 centipoises at a temperature of 25° C., and between 5 and 15 weight percent, based on the weight of said resin, of 2-vinyl-4-hydroxymethyl-1,3-dioxolane.

4. A curable composition comprising a liquid condensation resin of acrolein and pentaerythritol having a viscosity of 5,000 to 500,000 centipoises at a temperature of 25° C., and between 5 and 15 weight percent, based on the weight of said resin, of 2-(1-methylvinyl)-5-ethyl-4-propyl-1,3-dioxane.

5. A curable composition comprising a liquid condensation resin of acrolein and pentaerythritol having a viscosity of 5,000 to 500,000 centipoises at a temperature of 25° C., and between 5 and 15 weight percent, based on the weight of said resin, of 4-methyl-2-vinyl-1,3-dioxolane.

6. The composition of claim 1 cured at a temperature between 50° C. and 200° C. in the presence of an acid catalyst.

7. A method of producing a liquid composition capable of curing to a solid resin which comprises admixing a liquid condensation resin of acrolein and pentaerythritol with a reactive diluent selected from the class of 2-vinyl-1,3-dioxanes and 2-vinyl-1,3-dioxolanes.

References Cited in the file of this patent

FOREIGN PATENTS 757,573    Great Britain      Sept. 19, 1956